(12) United States Patent
Spriggs (10) Patent No.: US 11,014,762 B1
(45) Date of Patent: May 25, 2021

(54) APPARATUS, SYSTEMS AND METHODS FOR WEIGHING AND DISTRIBUTING DRILL CUTTINGS IN AN ENCLOSED CUTTINGS SKIP

(71) Applicant: GRASS SKIRT OILFIELD CONSULTING INC., Kaneohe, HI (US)

(72) Inventor: Paul N. Spriggs, Kaneohe, HI (US)

(73) Assignee: GRASS SKIRT OILFIELD CONSULTING INC., Kaneohe, HI (US)

( * ) Notice: Subject to any disclaimer, the term of this patent is extended or adjusted under 35 U.S.C. 154(b) by 420 days.

(21) Appl. No.: 16/117,424

(22) Filed: Aug. 30, 2018

Related U.S. Application Data (60) Provisional application No. 62/556,544, filed on Sep. 11, 2017.

(51) Int. Cl.
*B65G 43/08* (2006.01)
*G01G 17/02* (2006.01)
(Continued)

(52) U.S. Cl.
CPC ............. *B65G 43/08* (2013.01); *B65G 27/00* (2013.01); *G01G 17/02* (2013.01); *E21B 21/066* (2013.01)

(58) Field of Classification Search
CPC ...... G01G 17/04; E21B 21/066; B65G 27/00; B65G 43/08
See application file for complete search history.

(56) References Cited

U.S. PATENT DOCUMENTS

| | | | | |
|---|---|---|---|---|
| 3,805,905 A | * | 4/1974 | McClusky | B65B 1/22 177/160 |
| 4,696,357 A | * | 9/1987 | Beehler | G01G 13/295 177/145 |

(Continued)

FOREIGN PATENT DOCUMENTS

| WO | 2004083597 A1 | 9/2004 |
|---|---|---|
| WO | 2011000037 A1 | 1/2011 |

(Continued)

OTHER PUBLICATIONS

"A Users Guide to Intrinsic Safety", Cooper Crouse-Hinds MTL Inc., Houston Texas (USA), Doc. No. AN9003, Nov. 2010, p. 1-20.

(Continued)

*Primary Examiner* — Randy W Gibson
(74) *Attorney, Agent, or Firm* — Jeffrey L. Wendt; The Wendt Firm, P.C.

(57) ABSTRACT

A contaminated drill cuttings weighing and distributing apparatus includes a frame dimensioned to accept a cuttings skip. One or more vibration members are removably attached to the frame, the vibration members able to exert vibrations sufficient to substantially level contaminated drill cuttings in the contaminated cuttings skip. Load cells are placed in or on the frame and configured to send signals representative of local load on the frame to logic controllers that receive the signals from the load cells and send signals to the vibration members to vibrate the frame. Systems include lifting slings or chains and an enclosed skip. Methods of weighing and distributing contaminated drill cuttings in an enclosed cuttings skip.

19 Claims, 5 Drawing Sheets

(51) Int. Cl.
*B65G 27/00* (2006.01)
*E21B 21/06* (2006.01)

(56) References Cited

U.S. PATENT DOCUMENTS

| | | | | |
|---|---|---|---|---|
| 4,782,865 | A * | 11/1988 | Everman | B65B 1/32 |
| | | | | 141/83 |
| 4,854,353 | A * | 8/1989 | Russell | B65B 1/32 |
| | | | | 141/74 |
| 5,259,425 | A * | 11/1993 | Johnson | B30B 1/00 |
| | | | | 100/281 |
| 6,988,567 | B2 * | 1/2006 | Burnett | E21B 21/066 |
| | | | | 175/66 |
| 7,195,084 | B2 * | 3/2007 | Burnett | B65G 53/10 |
| | | | | 175/206 |
| 8,511,150 | B2 | 8/2013 | Lucas et al. | |
| 8,591,151 | B2 | 11/2013 | Webb | |
| 8,656,991 | B2 | 2/2014 | Farrar | |
| 8,662,163 | B2 | 3/2014 | Farrar | |
| 9,073,104 | B2 * | 7/2015 | Burnett | B09B 3/00 |
| 2012/0318581 | A1 | 12/2012 | Webb | |
| 2013/0228371 | A1 | 9/2013 | Farrar | |
| 2013/0228380 | A1 | 9/2013 | Farrar | |
| 2017/0152713 | A1 | 6/2017 | Dowdy | |

FOREIGN PATENT DOCUMENTS

| | | |
|---|---|---|
| WO | 2014149065 A1 | 9/2014 |
| WO | 2014149066 A1 | 9/2014 |
| WO | 2017095676 A1 | 6/2017 |

OTHER PUBLICATIONS

"BV Series Piston Vibrators", Chicago Vibrator, Division of CVP Group Inc., Westmont, Illinois (USA), Sep. 2015, p. 1-2.
"BV Air Cushioned Series Piston Vibrators", Chicago Vibrator, Division of CVP Group Inc., Westmont, Illinois (USA), Aug. 2015, p. 1.
Wikipedia, "Load Cell", author unknown, downloaded from the Internet Jul. 14, 2017, p. 1-6.
"Load Cells—Hydraulic", author unknown, downloaded from the Internet Jul. 14, 2017, p. 1-2.
"2.6m3 (16.5 bbls vacuum rated to 5 psi)", Type 111 Offshore Mud Cuttings Skips, OEG Offshore, downloaded from the Internet Jul. 7, 2017, p. 1.
"2.8m3 (17.5 bbls Mud Cuttings Skip)", Type 214 Mud Cuttings Skips, OEG Offshore, downloaded from the Internet Jul. 7, 2017, p. 1.
"6.4m3 (40 bbls vacuum rated to 5 psi)", Type 153 Offshore Mud Cuttings Skips, OEG Offshore, downloaded from the Internet Jul. 7, 2017, p. 1.
Large Drill Cuttings Skips, OEG Offshore, downloaded from the Internet Jul. 7, 2017, p. 1.
"OPT8241 3D Time-of-Flight Sensor", Texas Instruments, Dallas, Texas (USA), Oct. 2015, p. 1-34.
"Drilling Manual", 11th Ed., International Association of Drilling Contractors, Houston, Texas, USA, 2000, pp. Y1-Y90.

* cited by examiner

```
                                                           ┌─ 500
                                    502 ─┐
                            ┌───────────────────────────────────┐
                            │ A method of easily and safely weighing and distributing │
                            │ contaminated cuttings in an enclosed cuttings skip, │
                            │        the method comprising:     │
                            └───────────────────────────────────┘
                                    504 ─┐         ↓
                            ┌───────────────────────────────────┐
                            │ Placing a cuttings skip onto an apparatus comprising │
                            │    (i) a frame dimensioned to accept a cuttings skip; │
                            │ (ii) one or more vibration members removably attached to the │
                            │  frame, the vibration members able to exert vibrations sufficient │
                            │    to substantially level contaminated drill cuttings in the │
                            │                    cuttings skip; │
                            │ (iii) one or more load cells placed in or on the frame configured │
                            │  to send signals representative of local load on the frame; and │
                            │ (iv) one or more logic controllers that receives the signals from │
                            │   the load cells and sends signals to the vibration members to │
                            │                   vibrate the frame. │
                            └───────────────────────────────────┘
                                    506 ─┐        ↓
                            ┌───────────────────────────────────┐
                            │ Attaching a contaminated cuttings feed hose or chute to a │
                            │     feed opening on the enclosed cuttings skip. │
                            └───────────────────────────────────┘
                                    508 ─┐        ↓
                            ┌───────────────────────────────────┐
                            │ Flowing contaminated cuttings from a drilling or well completion │
                            │ operation into a cuttings skip through the contaminated cuttings │
                            │ feed hose or chute and into the feed opening of the cuttings skip. │
                            └───────────────────────────────────┘
                                    510 ─┐        ↓
                            ┌───────────────────────────────────┐
                            │ Determining weight at a plurality of local positions of the frame, │
                            │   enclosed cuttings skip, and contaminated cuttings inside the │
                            │      enclosed cuttings skip by operating the load cells. │
                            └───────────────────────────────────┘
                                    512 ─┐        ↓
                            ┌───────────────────────────────────┐
                            │ Distributing the contaminated cuttings in the enclosed cuttings │
                            │ skip from an undisturbed state to a disturbed, substantially level │
                            │    state by activating and operating the vibration members. │
                            └───────────────────────────────────┘

FIG. 8
```

APPARATUS, SYSTEMS AND METHODS FOR WEIGHING AND DISTRIBUTING DRILL CUTTINGS IN AN ENCLOSED CUTTINGS SKIP

BACKGROUND INFORMATION

Technical Field

The present disclosure relates to apparatus, systems, and methods in the onshore and marine (offshore) hydrocarbon exploration, production, drilling, well completion, well intervention, and leak containment fields. More particularly, the present disclosure relates to apparatus, systems, and methods useful for determining drill cuttings (sometimes referred to in the oil & gas industry as "mud cuttings", and herein sometimes as simply "cuttings") weight and distribution in an enclosed "mud cuttings skip" or "cuttings skip", sometimes referred to in the industry as "cuttings boxes", "drill cuttings bins", and other terms of art in the industry for a container that collects drill cuttings.

Background Art

Cuttings produced when drilling oil or gas wells with oil based drilling fluid, be it synthetic or natural, require special containment and treatment. This is generally a requirement stipulated by the governing authority, or in many cases, driven by the operator.

A service exists within the oil industry for the management, control, handling and eventual treatment of these contaminated cuttings. (As used herein, and as will be further explained, the term "contaminated" means any drill cuttings that have been through none, all or a combination of any one or more of the common mechanical, thermal, chemical cuttings waste treatment methods.) At the drilling rig site, the cuttings are collected into steel cuttings skips. The skips are enclosed and typically comprise at least a single hinged inspection hatch. The hatch has a rubber seal to prevent the ingress of air and egress of noxious fumes from the skip. Additional openings may exist on the skips. At least one will be for connecting the hose down through which the cuttings fall into the skip. A second similar opening may also exist depending on the skip design. A port for connecting a vent hose is often available as well as a port for a pressure/vacuum relief valve.

The complete assembly is enclosed making it difficult to determine the volume, dryness and distribution of cuttings inside the skip. The skips have a net weight themselves as well as a safe gross weight that they can contain. Naturally, the volume, and thus weight of cuttings must not exceed the volume and/or maximum allowable gross weight of the cuttings skip. However, not filling them completely may lead to unnecessary crane lifts, in other words, the skips being changed out before they are full.

The current means of determining the cuttings volume within the skip is to open an inspection hatch and look inside the skip. In doing so, the seal is broken on the skip; fumes vent from the skip into the surrounding environment and air (oxygen) is allowed to enter the skip. This is not a desirable condition, and is one that circumvents all efforts to keep the skips enclosed.

Quite often, the cuttings will form a pile directly beneath the discharge hose through which they fell. It is therefore common for rig workers to manually distribute the cuttings throughout the skip in order to evenly fill the skip. If the cuttings pile is left undisturbed, the cuttings have been known to back up within the discharge hose causing a blockage. This interrupts the cuttings handling process while the blockage is manually cleared. The greater concern is personnel now working around an open hatch pushing cuttings around a skip with whatever tool is available. The fumes coming out are very unpleasant.

Having an accurate understanding of the overall volume of cuttings returned from the well is generally desirable. This trending information is valuable to those drilling the well for various reasons. In an enclosed system, it is not possible to see the total volume of cuttings returned from the well. Although using a skip of known volume, the enclosed system prevents determination of the total volume contained. Subjective guesses at volumes are generally made.

Similar to total volume, the rate at which cuttings are being swept out of the well serves as valuable information from a drilling performance perspective. Ensuring good hole cleaning avoids a series of costly problems when drilling. Again, within an enclosed system, it is not possible to measure the rate at which cuttings are entering the skip.

The only current means of determining the gross weight of a cuttings skip in an offshore environment is to pick the skip up using one of the onboard cranes. To do this the crane must be attached to the skips using slings and the skip picked up. If the skip is still attached to the discharge hose and other hoses, then these need to be removed. To avoid this, the inspection hatch is normally opened and a visual determination of the skips fullness is determined. It may be possible to continue filling the skip based on weight, but unless the cuttings are distributed throughout the skip, the skip may be removed early since the gross weight is unknown. If effort to attach the crane has been made, and the hoses removed, the likelihood will be to just change the skip out for an empty one. This means skips are being back loaded partially full. The more skips used and handled means an increase in cost, but more importantly, increased handling of heavy lift items. The fewer heavy lifts performed at a rig site, the better and safer the operation. On land-based operations, the forklift may be used to lift the cuttings skip. Not all forklifts have a means of measuring the weight of the item they are picking up, and there are many factors that influence the gross weight a forklift can lift. Uncertain of this, a mobile crane may be necessary to lift the skip in order to determine the weight. Again, at this stage, hoses will have been disconnected, at which point, the skip may as well be changed out.

Analogous containers may be used during well completion, production, and workover. The present disclosure is applicable to all such containers that must be lifted and removed or replaced, and referred to herein as "oilfield containers" or "rig containers", since they frequently appear on drilling rigs and are used by rig workers. There are many types of offshore containers, oilfield containers, rig containers and the like, and the present disclosure is relevant to all, whether compliant or not with industry standards such as DNV (Det Norske Veritas) 2.7-1 or BSEN (British Standard European Norm) 12079, vacuum-rated or non-vacuum-rated, and regardless of size, the only requirement being that they are "enclosed" such the inside cannot be viewed without significant cutting open of the container or removal of bolts or other fasteners. Waste skips typically have a hinged plastic or metal lid that can more or less easily be lifted by a worker or forklift, and are therefore not within the present disclosure.

U.S. Pat. Nos. 8,656,991 and 8,662,163 disclose a closed loop system for waste treatment that has as its intent to lower the risk of permanent paralysis of a person working on a rig and lower the chance of a head injury for a person working on a rig by eliminating the need to lift a box of waste off a rig. WO2004083597A1 discloses apparatus and methods for moving or transporting drilled cuttings, and in certain embodiments tank sensors weigh a tank collecting cuttings, and the level of dried cuttings in a tank is measured using an ultrasonic sensor. However, neither level nor weight inside contaminated drill cutting skips, nor weight of contaminated drill cuttings is measured. Contaminated cuttings that may have undergone one or more treatments prior to entering the skip may pose more problems of clogging and piling compared to contaminated cuttings, since they have less fluid that may lubricate the pile, although contaminated cuttings that may have undergone one or more treatments prior to entering the skip pose somewhat less risk of exposure to noxious fumes as contaminated cuttings. Contaminated cuttings, especially those that have undergone some form of drying treatment, may clog skip feed lines, and may form piles of cuttings without spreading out in the skip or other container, forcing personnel to insert a stick or pole into the skip to unclog the feed line, or spread out the pile of cuttings. Examples of cuttings skips may presently be found on the Internet websites of companies such as: OEG Offshore; Tiger Offshore (Beaumont, Tex.); and Suretank Group Ltd. (Dunleer, Co. Louth, Ireland). Rig cranes are available from sources such as TSC Offshore and others. All of these patents, published patent applications, and Internet webpages showing skips, oilfield containers, drilling rigs, and cranes for use on drilling rigs are incorporated herein by reference for their disclosure of structure and operation of cuttings skips, and accessories for same, such as hoses, pumps, and the like, and rigs and rig cranes.

Rig personnel safety is of utmost concern. The inventor herein personally knows of incidents, both offshore and onshore, where the skips have been determined to be not full of cuttings but nevertheless have been lifted by rig cranes and replaced with empty skips. As noted above this results in more than necessary amount of crane lifts on rigs, with the potential for accidents and injury to rig workers therefore increasing.

As may be seen, current practice of weighing and distributing contaminated cuttings in enclosed skips, attaching chains and other lifting devices, and lifting out the partially full skips and replacing them with empty skips may not be adequate for all circumstances, and at worst have resulted in injury to rig workers. There remains a need for more safe, robust methods and apparatus allowing weighing and distributing of contaminated drill cuttings in enclosed skips to be determined, particularly for methods and apparatus that reduce exposure of rig personnel to fumes from cuttings and unnecessary lifts using rig cranes and potential for injury. The methods and apparatus of the present disclosure are directed to these needs.

SUMMARY

In accordance with the present disclosure, apparatus for weighing and distributing contaminated drill cuttings in enclosed cuttings skips are presented, and methods of using same to weigh and distribute contaminated cuttings in skips and other containers are described which reduce or overcome many of the faults of previously known apparatus and methods.

A first aspect of the disclosure is a contaminated drill cuttings weighing and distributing apparatus comprising:
(a) a frame dimensioned to accept a contaminated cuttings skip;
(b) one or more vibration members removably attached to the frame, the vibration members able to exert vibrations sufficient to substantially level contaminated drill cuttings in the contaminated cuttings skip;
(c) one or more load cells placed in or on the frame configured to send signals representative of local load on the frame;
(d) one or more logic controllers that receives the signals from the load cells and sends signals to the vibration members to vibrate the frame.

In certain embodiments the one or more vibration members may be individually configured to operate in modes selected from the group consisting of continuous mode, periodic mode, and manual mode. In certain embodiments the one or more vibration members may be selected from the group consisting of hydraulic, pneumatic, and electronic vibration members. In certain embodiments, the one or more vibration members may be configured to gyrate (rotate, spin, revolve) the frame. In certain embodiments the one or more loads cells may be selected from the group consisting of hydraulic, pneumatic, and strain gauge load cells. In certain embodiments the one or more vibration members and controllers may be integral. In certain embodiments the number of load cells may range from 1 to about 10. In certain embodiments the number of load cells may range from about 2 to about 6. In certain embodiments the one or more loads cells may include a human/machine interface. In certain embodiments the frame may include one or more lugs adapted to constrain lateral movement of a contaminated cuttings skip on the frame. In certain embodiments the one or more lugs may be adjustable. In certain embodiments the frame may comprise a body having four co-planar frame arms extending from a center of the frame, each frame arm having attached to a lower surface thereto a frame leg, the four co-planar frame arms defining an upper surface configured to receive a bottom of a contaminated cuttings skip. In certain embodiments at least one of the frame legs may be adjustable to raise and lower respective frame arms. In certain embodiments each frame leg may include an elastomeric pad attached to a bottom of each frame leg. Certain embodiments may further include three or more lifting points on the frame for attaching a lifting mechanism thereto for lifting the apparatus. Certain embodiments may further comprise three or more slings or chains, one of each sling or chain attached to a respective one of the three or more lifting points, for example, but not limited to, pad eyes. Certain method embodiments may include gyrating the frame by operating the vibration members.

A second aspect of the disclosure is a system for easily and safely weighing and distributing contaminated drill cuttings in an enclosed cuttings skip, the system comprising:
(a) an enclosed cuttings skip;
(b) the weighing and drill cuttings distributing apparatus of the disclosure upon which the enclosed cuttings skip is removably placed;
(c) a contaminated cuttings hose or chute removably attached to a cuttings fill opening of the enclosed cuttings skip; and
(d) one or more sources of power selected from the group consisting of hydraulic, pneumatic, and electric power removably attached to the vibration members and load cells.

In certain embodiments the system may further comprise three or more slings or chains, one of each sling or chain attached to a respective one of the three or more lifting points, for example, but not limited to, pad eyes.

A third aspect of the disclosure is a method of easily and safely weighing and distributing contaminated cuttings in an enclosed cuttings skip, the method comprising:

(a) placing a contaminated cuttings skip onto an apparatus comprising:
  (i) a frame dimensioned to accept a contaminated cuttings skip;
  (ii) one or more vibration members removably attached to the frame, the vibration members able to exert vibrations sufficient to substantially level contaminated drill cuttings in the contaminated cuttings skip;
  (iii) one or more load cells place in or on the frame configured to send signals representative of local load on the frame;
  (iv) one or more logic controllers that receives the signals from the load cells and sends signals to the vibration members to vibrate the frame;
(b) attaching a contaminated cuttings feed hose or chute to a feed opening on the enclosed cuttings skip;
(c) flowing contaminated cuttings from a drilling or well completion operation into a cuttings skip through the contaminated cuttings feed hose or chute and into the feed opening of the cuttings skip;
(d) determining weight at a plurality of local positions of the frame, enclosed cuttings skip, and contaminated cuttings inside the enclosed cuttings skip by operating the load cells; and
(e) distributing the contaminated cuttings in the enclosed cuttings skip from an undisturbed state to a disturbed, substantially level state by activating and operating the vibration members.

As used herein "substantially level" means that at least two different loads cells differ by less 1 or less than 2, or less than 5, or less than 10 kg. In other embodiments the contaminated cuttings may be said to be "evenly distributed", where this allows for some degree of contour in the top surface of the cuttings in the skip, but the weight is substantially equal across the skip as indicated by the difference in load cell readings as mentioned in the previous sentence. Certain method exemplary embodiments include those wherein the vibration members may be operated to not only vibrate the cuttings skip, but also gyrate the cuttings skip. As used herein the term "gyrate" means to at least partially rotate or partially revolve the skip first in one direction then the opposite direction in order to shake the skip and substantially level the contaminated cuttings in the enclosed skip. The gyrations would be appropriately restricted in magnitude of movement and oscillation frequency to ensure worker safety and to use the least amount of rig space possible. Partial rotation or revolution would in most embodiments be less than 30 degrees (15 degrees in both directions), or less than 20 degrees (10 degrees in both directions), or less than 10 degrees (5 degrees in both directions).

These and other features of the apparatus, systems, and methods of the disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain sensor mounting apparatus and methods may comprise a number of physical components and features, but may be devoid of certain optional hardware and/or other features.

BRIEF DESCRIPTION OF THE DRAWINGS

The manner in which the objectives of this disclosure and other desirable characteristics can be obtained is explained in the following description and attached drawings in which:

FIG. 1A is a schematic plan view, with some parts in phantom.

FIGS. 5 and 6 are schematic plan views, with some parts in phantom.

Figure 8:
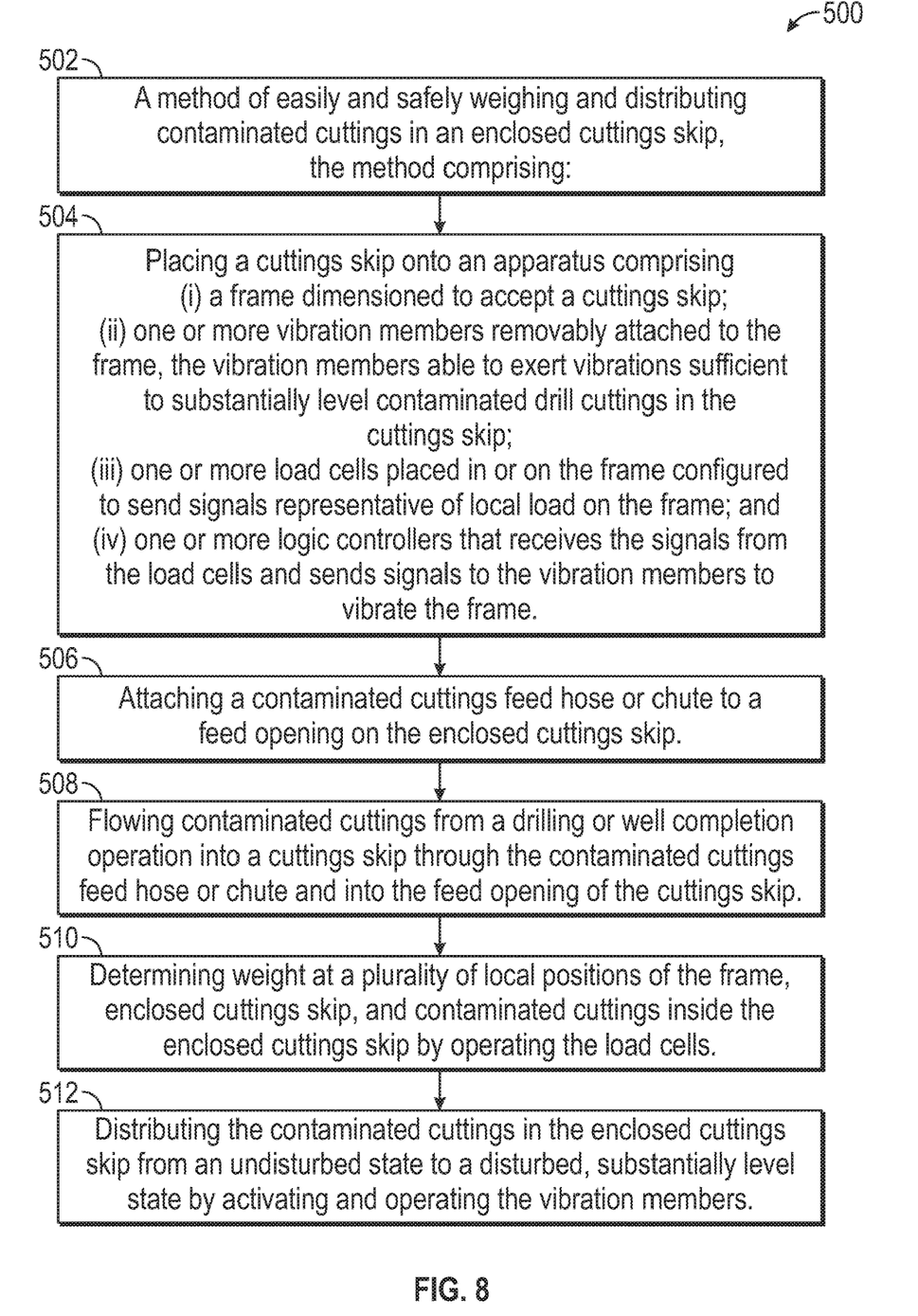
FIG. 8 is a logic diagram of one method of weighing and distributing contaminated cuttings in an enclosed cuttings skip.

It is to be noted, however, that the appended drawings of FIGS. 1A, 1B, 1C, 4, 5, 6, and 7 may not be to scale, and illustrate only typical apparatus embodiments of this disclosure. Furthermore, FIG. 8 illustrates only one of many possible methods of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

In the following description, numerous details are set forth to provide an understanding of the disclosed apparatus, combinations, and methods. However, it will be understood by those skilled in the art that the apparatus, combinations, and methods disclosed herein may be practiced without these details and that numerous variations or modifications from the described embodiments may be possible. All U.S. published patent applications and U.S. patents referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein.

As mentioned herein, "contaminated" cuttings means any drill cuttings, including those that have been through none, all or a combination of any one or more of the common mechanical, thermal, chemical cuttings waste treatment methods. The IADC (International Association of Drilling Contractors) Drilling Manual, when discussing "Solids Control Equipment", discusses various methods of separating the solids from the drilling fluid through mechanical or thermal methods. There is also chemical treatment whereby flocculants, for example, may be added to assist in separating fluid from rock. However, the chemicals are used in conjunction with mechanical methods. So a shaker, which, on most rigs, is the primary mechanical treatment, provides a vibratory screening treatment. After this, one or more hydrocylones and centrifuges may be used to extract more fluid out of the cuttings. This would thus be the centrifugal force applied. Additionally there could be a cuttings drier installed to reduce the fluid content down to less than 5%. This may also be a centrifugal method. The apparatus, systems and methods of the present disclosure are applicable to all drill cuttings, and indeed other solids.

Apparatus, systems, and methods of the present disclosure allow weighing and distributing the contents of a typical cuttings skip (either open or enclosed). In certain embodiments the apparatus would be located at the rig site and placed beneath the active cuttings skip. Offshore, in certain embodiments the apparatus may be on a separate vessel. Onshore, in certain embodiments the apparatus may be skid-mounted or truck-mounted. The load cells weigh the load placed on the frame. In certain embodiments, a worker could zero out the weight when the empty skip is loaded and then determine the weight of just the cuttings. In certain other embodiments, a worker could weigh the skip and contents too. Optionally, if more than one load cell is employed, a worker may be able to determine a differential distribution of cuttings in the skip, then a signal may be sent to start vibrating the frame and thus skip.

The cuttings skip is placed on the apparatus and the discharge hose/chute connected to the skip. All other hoses could be connected at this stage. The apparatus may then obtain several local weights or local loads according to the loads placed thereon in the proximity of the load cells, and differences between two or more local weights or local loads will trigger one or more vibration members to vibrate and/or gyrate the skip with force sufficient to distribute the contaminated cuttings substantially evenly throughout the skip, as will now be explained more fully with references to the drawing figures.

Figure 1A:
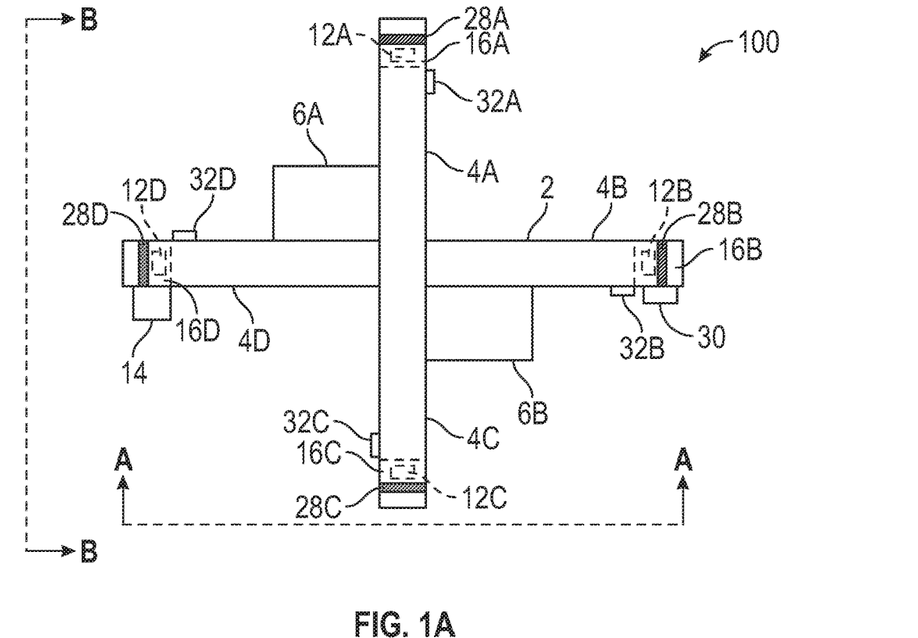
Figure 1B:
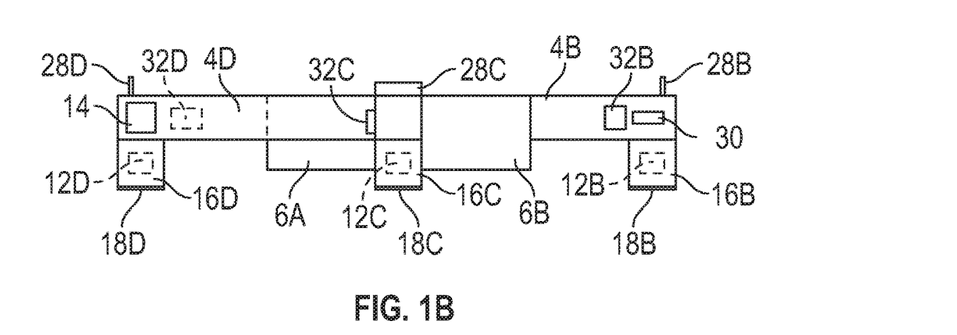
FIGS. 1B and 1C are schematic side elevation views, also with some parts in phantom, of one embodiment of the present disclosure.
Figure 1C:
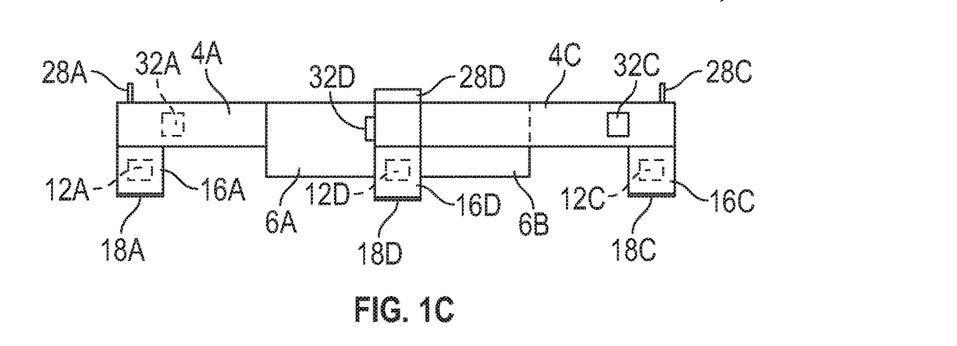

One embodiment 100 of apparatus of this disclosure is illustrated in schematic plan view in FIG. 1A, and in schematic side elevation views in FIGS. 1B and 1C. Some components that are obscured from view are illustrated with dotted lines or phantom lines. The apparatus illustrated schematically in FIGS. 1A, 1B, and 1C includes a frame 2, in some embodiments sometimes referred to herein as a cross frame having four frame arms 4A, 4B, 4C, and 4D, positioned at 90 degrees from each other, made of a suitably strong material, such as 304 or 316 stainless steel or other steel alloy; rigid plastic such as polycarbonate, polyvinyl chloride (PVC), high and low density polyethylene, and polypropylene; and composite materials such as fiber-reinforced polymers (FRP), where the fibers may be glass, carbon, aramid, or basalt. In certain embodiments the frame material may be fatigue and corrosion resistant. Frames arms may be I-beams, rectangular or triangular hollow beams, rectangular or triangular solid beams, hollow D-beams, X-beams, and the like, and combinations thereof.

In certain embodiments, frame arms 4A, 4B, 4C, and 4D need not be 90 degrees apart, for example, when in an "X" configuration. Frame 2 could comprise other designs, for example, but not limited to designs having six frame arms, or eight frame arms, or two or more concentric unfilled rectangles with interconnecting support struts (such as in embodiment 200 schematically illustrated in FIG. 5, having an outer square 38, and inner square 40, and connecting support struts 42), or a circular platform, or two or more concentric circles having radially connecting struts (as in embodiment 300 schematically illustrated in FIG. 6, having an outer ring 44, an inner ring 46, and connecting radial support struts 48). Other embodiments may be designs comprising a single filled square (or platform) such as platform 50 of embodiment 400 illustrated schematically in FIG. 7.

Referring again to FIGS. 1A, 1B, and 1C, within or removably attached to frame 2 would be one or more vibration members 6A and possibly 6B, that is (are) either powered electrically, pneumatically or hydraulically. Vibration members 6A and 6B impart a vibratory and/or gyratory force. The magnitude of the force depends on the type and number of vibration members employed, shape of the skip, and the retention on cuttings or "ROC", which is reflective of the degree of processing the cuttings have received. The magnitude of the force on frame 2 is sufficient to substantially level contaminated drill cuttings in an enclosed contaminated cuttings skip placed on frame 2. Table 1 lists frequency of vibration, force, and air consumption at various air pressures for one type of pneumatic vibrator known as the BV series from Chicago Vibrator Products. Noise level may also be a concern and may influence the type of vibration members used and the magnitude of force applied.

Figure 2:
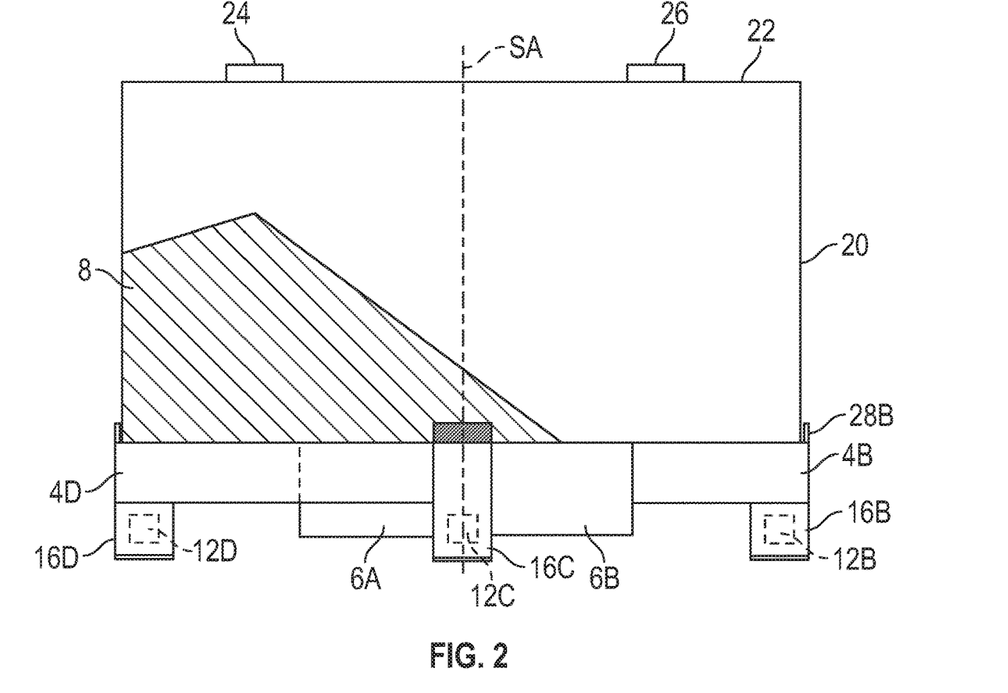
FIGS. 2 and 3 are schematic side views illustrating use of the embodiment of FIGS. 1A, 1B, and 1C to vibrate the frame and level contaminated cuttings in an enclosed cuttings skip, with FIG. 2 illustrating schematically the undisturbed cuttings, and FIG. 3 illustrating the disturbed (leveled) cuttings.
Figure 3:
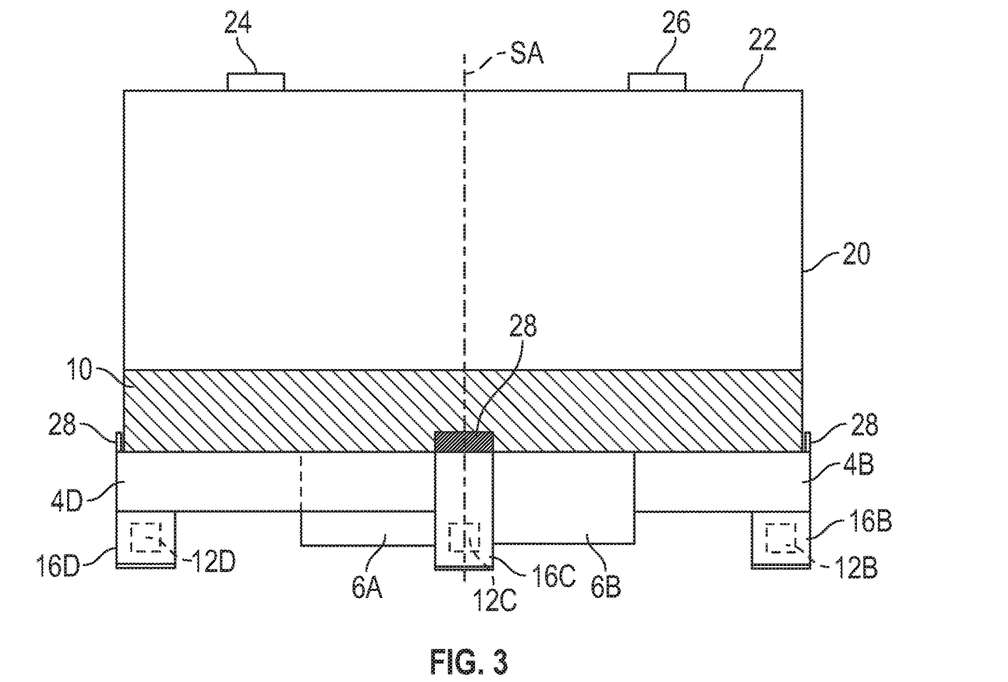
Figure 4:
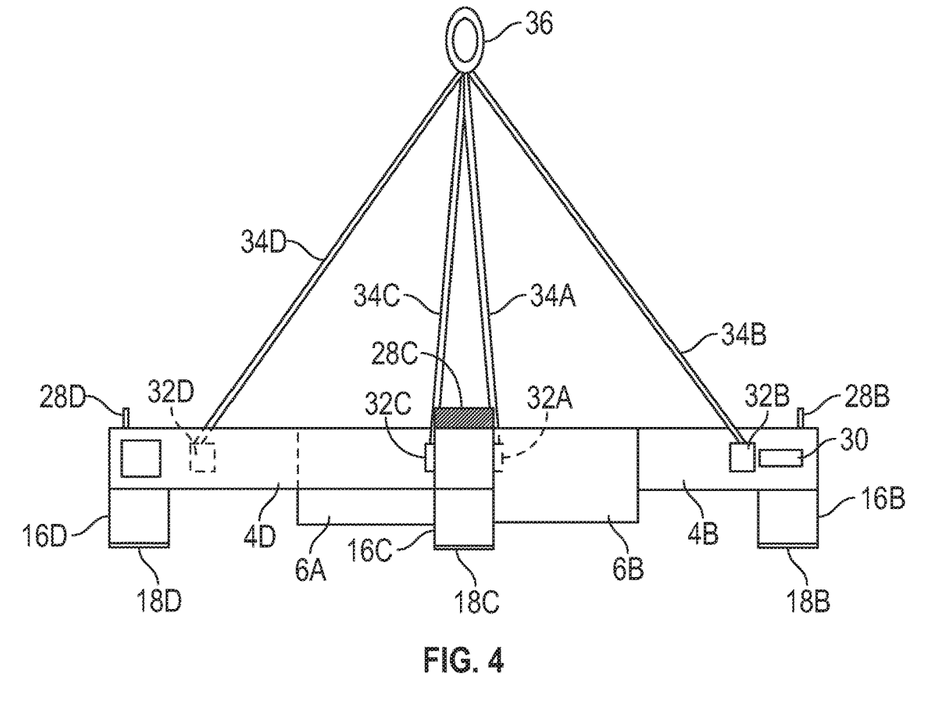
FIG. 4 is a schematic side elevation view illustrating how the frame illustrated schematically in FIG. 3 may be picked up and transported.
Figure 5:
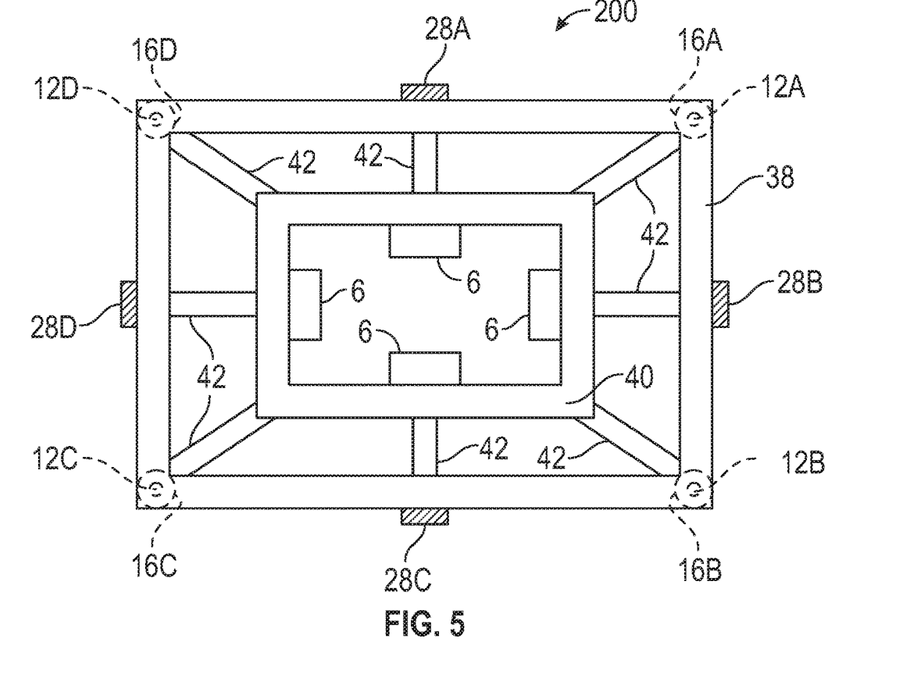
Figure 6:
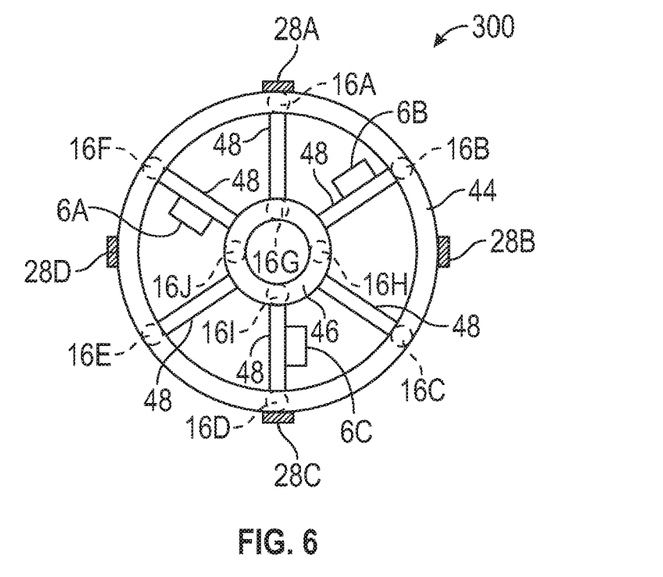
Figure 7:
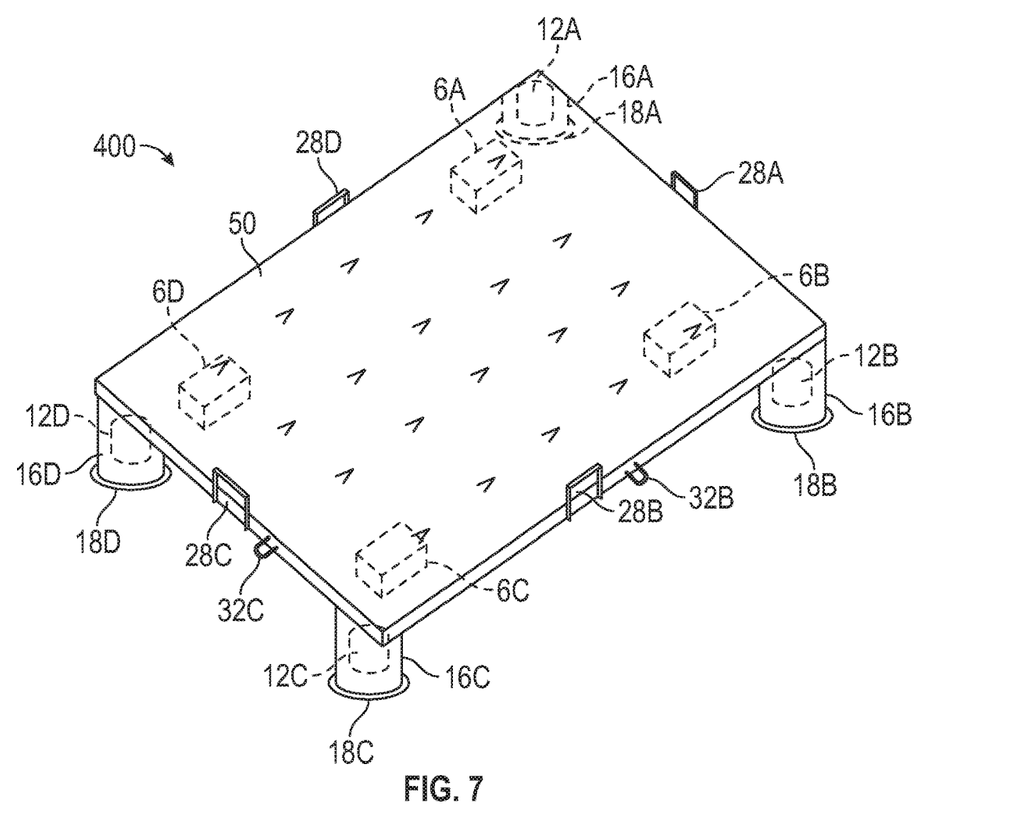
FIG. 7 is a schematic perspective view, also partially in phantom, of three other apparatus embodiments of the present disclosure.

During vibration, the contaminated drill cuttings distribute themselves inside skip 20 from a non-distributed state 8, such as illustrated schematically in FIG. 2, where most of the contaminated drill cuttings have formed in a pile to the left of the skip symmetrical axis SA, to a distributed state 10, such as illustrated schematically in FIG. 3, where the contaminated drill cuttings are distributed throughout the confines of skip 20. Skip 20 includes a top surface 22, a skip filling opening 24, and a skip non-fill opening 26. Load cells 12A, 12B, 12C, and 12D located in either the legs 16A-D or on frame 2 will read the local load imposed in the vicinity of the legs. One or all readings may be displayed in embodiment 100 locally on Human Machine Interface (HMI), such as a touchscreen display or similar, 14, on frame 2. In certain embodiments HMI 14 may record and/or transmit the data via wired or wireless communication to another HMI, such as a laptop, desktop, or hand-held computer or display. In certain embodiments frame 2 may simply be a platform, and a motive force generator coupled to the platform to vibrate/gyrate the entire platform.

TABLE 1

| | BV Air Cushioned Series Piston Vibrator Specifications* | | | | | | | | | | | | |
|---|---|---|---|---|---|---|---|---|---|---|---|---|---|
| | Frequency (VPM) | | | | Force (LBS) | | | | Air Consumption (CFM) | | | | Db |
| MODEL | 20 psi | 40 psi | 60 psi | 80 psi | 20 psi | 40 psi | 60 psi | 80 psi | 20 psi | 40 psi | 60 psi | 80 psi | 60 psi |
| BV-112-AC | | 3850 | 4100 | 4900 | | 53 | 60 | 85 | | 2.3 | 2.9 | 2.5 | 83.5 |
| BV-150-AC | 2000 | 2400 | 2700 | 3000 | 50 | 72 | 91 | 112 | 1.8 | 3.4 | 3.8 | 4.1 | 82.5 |
| BV-225-AC | 1500 | 1850 | 2150 | 2400 | 80 | 122 | 164 | 205 | 3 | 4.8 | 5.8 | 7 | 91 |
| BV-312-AC | 1100 | 1370 | 1550 | 1825 | 166 | 257 | 329 | 456 | 4.4 | 7.6 | 10.2 | 13 | 86.5 |

TABLE 1-continued

BV Air Cushioned Series Piston Vibrator Specifications*

| | Frequency (VPM) | | | | Force (LBS) | | | | Air Consumption (CFM) | | | | Db |
|---|---|---|---|---|---|---|---|---|---|---|---|---|---|
| MODEL | 20 psi | 40 psi | 60 psi | 80 psi | 20 psi | 40 psi | 60 psi | 80 psi | 20 psi | 40 psi | 60 psi | 80 psi | 60 psi |
| BV-350-AC | 1100 | 1400 | 2350 | 2450 | 203 | 334 | 927 | 1008 | 13.75 | 14 | 14 | 14 | 94 |
| BV-425-AC | 1130 | 1410 | 1690 | 1940 | 486 | 757 | 1087 | 1433 | 4.8 | 8 | 11 | 14 | 94 |

*Chicago Vibrator Products, Division of CVP Group, Inc. Westmont, Illinois, U.S.A.
(VPM = vibrations per minute; LBS = pounds force; CFM = cubic feet per minute; Db = decibels)

Referring once again to embodiment 100 illustrated schematically in FIGS. 1A, 1B, and 1C, frame 2 has four legs 16A, 16B, 16C, and 16D, one each attached to and extending perpendicularly from each respective arm 4A, 4B, 4C, and 4D. One of load cells 12A, 12B, 12C, and 12D is located in each respective leg 16A, 16B, 16C, 16D (or on each respective leg, depending on the type of load cell used). In certain embodiments, the load cells may be positioned within arms or other members making up frame 2. In any case, the number of load cells will be sufficient to provide an accurate and representative reading of the load being imposed, perhaps ranging from 1 to about 10, or from about 2 to about 8, or from about 4 to about 8, inclusive.

In embodiment 100 and other embodiments, the base of each leg 16A, 16B, 16C, and 16D may have an elastomeric pad 18A, 18B, 18C, and 18D attached to a bottom surface thereof to prevent or reduce vibrations through to the deck of an offshore or onshore facility. Pads 18A-D may also function to maintain the apparatus fixed in position.

While a perfectly level frame 2 is not necessary, frame 2 may be leveled by adjusting height of one or more of legs 16A, 16B, 16C, and 16D. Leg height adjustment may be made through either an adjustment device integral to one or more legs 16A, 16B, 16C, and 16D or by adding and/or removing "shim like" parts from underneath the necessary leg. Determining if frame 2 is level may be achieved by any number of techniques, such as bubble-type level, laser level, and the like. In embodiment 100 level is determined by observing an installed spirit bubble type level 30. This may also be determined by manually placing a standalone spirit level on frame 2.

Apparatus of the present disclosure may be constructed in several different embodiments. In certain embodiments apparatus of the present disclosure may be constructed to accept a skip of prescribed dimensions. In other embodiments, apparatus of the present disclosure may be constructed to accept a range of skip sizes. In embodiment 100, the apparatus has four lugs 28A, 28B, 28C, and 28D located on frame 2. For an apparatus designed for prescribed skips, the lug 28 positions are fixed and frame 2 size is tailored to the skip 20 size. For an apparatus capable of receiving a range of skip sizes, the lugs 28 may be adjustable. As used herein "adjustable" and "adjusted" mean one or more of vertically, horizontally, rotationally about an axis, rotationally in a plane, orbitally, and the like. Lugs 28 may be adjusted and optionally locked in place to secure the skip substantially centrally on the apparatus (substantially in this context means off center by no more than a few centimeters, where a few centimeters may be as much as 25 cm, or as much as 10 cm, or as much as 5 cm). The lugs may be adjusted for example by being spring-loaded, and lockable for example in different positions. The lugs may have a height ranging from about 2 to about 6 inches (from about 5 cm to about 30 cm), a thickness ranging from about 0.5 cm to about 2 cm, and a width ranging from about 2 to about 6 inches ((from about 5 cm to about 30 cm). Lugs 28 may be a different or same material as the frame, but in most embodiments they would be the same material as the frame and made of steel, such as carbon steel. Lugs 28 may be rubber-coated. In certain embodiments lugs 28 may be L shape in profile, with a hole in one leg of the L through which a threaded stud passes through. The stud would be inserted into a slot in the frame and slid up to the edge of the skip and then locked in place by tightening a bolt on the stud, which keeps the L in place based on friction. In place of a bolt, a cam type lever (like on bike wheels) may be used to hold the lug in place. It is not necessary to clamp the skip onto the frame, although certain embodiments may include that option. The L-shaped lugs would primarily function to retain the skip from lateral motion on the frame. In certain embodiments, all four clamps may be interlocked so that when pulled outwards they guide the person in spotting the skip on the frame to get it centered on the frame. Marked graduations on the top surface of the frame may be employed to give an indication of position of the skip on the frame when centering the skip on the frame. Certain embodiments may employ rubber pads on the leg of the L that butts up to the skip to reduce noise. In other embodiments, a worm screw type lug may be employed, but this would be more costly to manufacture.

Apparatus of the present disclosure may be transported in several ways. Lifting points 32A, 32B, 32C, and 32D may be included on apparatus embodiment 100 to which appropriate lifting slings 34A, 34B, 34C, and 34D may be attached (FIG. 4) when it is desired to lift the apparatus. A lifting ring 36 or other connector may be used for this purpose. If necessary, apparatus of the present disclosure may be built to meet Det Norske Veritas (DNV) or American Bureau of Standards (ABS) standards for lifting. Additionally, apparatus of the present disclosure may be placed in an approved transport basket for transportation offshore. The provision of lifting points (for example, but not limited to, pad eyes) and slings are beneficially included to lift the apparatus into the DNV/ABS approved transport basket.

Once an apparatus of the present disclosure is in place at the rig site, a power supply will be attached to the apparatus. If pneumatically driven, then an air hose will be attached most probably with a typical crow's foot fitting. In certain embodiments the apparatus will operate off a typical air pressure (for example, 60 psig, or 414 kPa) supplied from a rig's air receiver. Air driven embodiments will not pose a risk with respect to zone classification since they will not have the potential to cause a spark.

In apparatus embodiments that are electrically driven, then a suitably sized electrical cable will be attached to the vibration members. The connection (voltage and amperage) will be appropriate for the zone rating desired of the apparatus. In certain embodiments the cable may be run and connected to an identified power supply at the rig. Certain embodiments may employ a dedicated power supply. In exemplary embodiments, apparatus of the present disclosure will have an electrical isolation (lockout) device on the apparatus.

In apparatus embodiments that are hydraulically driven, then suitable hydraulic hoses will be connected to the apparatus. Hydraulic actuation is beneficial since it poses reduced risk of sparking. In certain embodiments, the hydraulic hoses may be connected to a remotely located hydraulic power unit.

In embodiments where connection to one or more remote HMI units is desired, this may be achieved by an intrinsically safe cable and connection so as to allow the apparatus to operate in the required zoned area. If no remote access is required, power to operate the HMI and load cells may be integral to the apparatus, such as batteries, for example, but not limited to, Li-ion batteries. In these embodiments, the power source may be enclosed allowing it to operate in a zoned area (Zone 0 (gases) in accordance with International Electrotechnical Commission (IEC) methods). By "intrinsically safe" is meant the definition of intrinsic safety used in the relevant IEC apparatus standard IEC 60079-11, defined as a type of protection based on the restriction of electrical energy within apparatus and of interconnecting wiring exposed to a potentially explosive atmosphere to a level below that which can cause ignition by either sparking or heating effects. For more discussion, see "AN9003—A User's Guide to Intrinsic Safety", retrieved from the Internet Jul. 12, 2017, and incorporated herein by reference.

With skip 20 in place on an apparatus of the present disclosure, illustrated schematically in FIGS. 2 and 3, the initial load on the apparatus is displayed and recorded. In certain method and apparatus embodiments, this load can be zeroed out to record just the load of cuttings 8. In certain method and apparatus embodiments, it is possible to switch back to the gross weight by interfacing with the HMI 14 or any remote reader installed. As cuttings fall into skip 20, one or more load cells 12A-D provide a local reading of weight at the location of the load cells. Depending on how many load cells are employed, and how many are activated or working, each provide a load reading. The number of load cells used depends on the design of frame 2, and may range from 1 to 10 or higher, or from 1 to 6 or from 1 to 4. In certain embodiments, such as embodiment 100, four load cells 12A-D may be used, positioned about the frame generally in a square pattern. In certain embodiments the apparatus has the option of starting the vibration members 6A and 6B automatically when the load cells register a pre-defined load difference, for example more than 1 kg, or more than 2 kg, or more than 5 kg, or more than 10 kg or higher. In certain embodiments, when the load difference reading between two or more load cells reduces to a pre-defined threshold, the apparatus will automatically shut off vibration members 6A, 6B. Alternatively, in certain other method and apparatus embodiments, vibration members 6A, 6B may be manually switched on and off depending on which mode (continuous, periodic, or manual) the operator wishes to run the apparatus and perform the method.

The volume of cuttings entering skip 20 may be determined by initially entering the weight (or an average of a range of weights) of a known volume of the produced cuttings. This value, a density or average density, is entered into HMI 14 allowing the apparatus to record the rate of cuttings entering skip 20 and the total volume in it. In certain embodiments, internal algorithms in HMI 14 may calculate the height of material within skip 20. This may then be displayed in a series of ways such as "percentage full", number of inches, centimeters, and the like. In certain embodiments, an additional function within HMI 14 may be to audibly alarm when the calculated height of the cuttings reaches a level set by the operator. In certain embodiments this alarm may be sounded at the apparatus as well as remotely. In certain embodiments, a time of flight (TOF) device, such as a laser, may be used to recognize an uneven distribution of cuttings and then initiate one or more vibration members. Apparatus of this nature are described in my co-pending patent application Ser. No. 16/117,379, filed Aug. 30, 2018 (now U.S. Pat. No. 10,732,020), and incorporated herein by reference. A collar mounted between the skip cuttings inlet and fill hose or pipe may be used to hold the laser. Alternatively, a multipoint laser scanner may be attached to another skip opening on the top of the skip using a coupling and blind flange.

Frame, legs, lugs, lifting points, and vibration members should be capable of withstanding long term exposure to probable liquids and vapors, including hydrocarbons, drilling fluids (oil-based and water-based), solvents, brine, antifreeze compositions, hydrate inhibition chemicals, and the like, typically encountered in offshore and onshore drilling activities.

What has not been recognized or realized is an apparatus and method to weigh and distribute contaminated cuttings level in enclosed cuttings skips safely and with fewer crane lifts. Apparatus and methods to accomplish this without significant risk to rig workers is highly desirable. As explained previously, rather non-technical and unsafe methods exist to weigh and distribute contaminated drill cuttings in enclosed skips, but rig personnel do not necessarily favor these methods. The present inventor, however, personally knows of the inefficiencies of such practices and the inherently unsafe conditions they create. Multiple accidents have injured rig workers on working drill rigs resulting from heavy lifts. As an additional safety feature, in practice, for example for offshore use, the apparatus of the present disclosure may be painted or otherwise colored or made reflective for ease of recognition.

FIG. 8 is a logic diagram of one method embodiment 500 for easily and safely weighing and distributing contaminated cuttings in an enclosed cuttings skip. Method embodiment 500, illustrated in the logic diagram of FIG. 8, comprises a method of easily and safely weighing and distributing contaminated cuttings in an enclosed cuttings skip, the method comprising (box 502) placing a contaminated cuttings skip onto an apparatus comprising (i) a frame dimensioned to accept a contaminated cuttings skip; (ii) one or more vibration members removably attached to the frame, the vibration members able to exert vibrations sufficient to substantially level contaminated drill cuttings in the contaminated cuttings skip; (iii) one or more load cells place in or on the frame configured to send signals representative of local load on the frame; and (iv) one or more logic controllers that receives the signals from the load cells and sends signals to the vibration members to vibrate the frame, Box 504. Method embodiment 500 further includes attaching a contaminated cuttings feed hose or chute to a feed opening on the enclosed cuttings skip, Box 506. Method embodiment 500 further includes flowing contaminated cuttings from a drilling or well completion operation into a cuttings skip through the contaminated cuttings feed hose or chute and into the feed opening of the cuttings skip, Box 508. Method embodiment 500 further includes determining weight at a plurality of local positions of the frame, enclosed cuttings skip, and contaminated cuttings inside the enclosed cuttings skip by operating the load cells, Box 510, and distributing the contaminated cuttings in the enclosed cuttings skip from an undisturbed state to a disturbed, substantially level state by activating and operating the vibration members, Box 512.

In alternative embodiments, the frame need not be rectangular or round, nor must the legs be tubular/cylindrical as illustrated in the drawings, but rather the frame could take any shape, such as a box or cube shape, elliptical, triangular, while the legs may be prism-shaped, hemispherical or semi-hemispherical-shaped (dome-shaped), or combination thereof and the like, as long as the vibration members and, depending on type, the load cells, have suitable fittings to connect (either via wired or wireless communication) to a power source. In yet other embodiments, the skip may be rectangular, but this arrangement is not strictly necessary in all embodiments. For example, one or more corners of the skip could be rounded. It will be understood that such embodiments are part of this disclosure and deemed with in the claims. Furthermore, one or more of the various components may be ornamented with various ornamentation produced in various ways (for example stamping or engraving, or raised features such as reflectors, reflective tape, patterns of threaded round-head screws or bolts screwed into holes in the frame), such as oil rig designs, oil tool designs, logos, letters, words, nicknames (for example BIG JAKE, and the like). The frame may include optional hand-holds, which may be machined or formed to have easy-to-grasp features for fingers, or may have rubber grips shaped and adorned with ornamental features, such as raised knobby gripper patterns.

In certain embodiments, a vibrating wand may be used by a worker or machine to stab into a pile of contaminated cuttings inside the skip and vibrate the pile, or a portion of the pile, as is currently used in during concrete pours. As vibration is a very effective tool to assist the consolidation and finishing of concrete, so it is with contaminated cuttings. Internal (immersed) vibrators are an effective way to transfer vibrational energy to the contaminated cuttings pile to distribute the pile. High frequency (10,000 to 12,000 vibrations per minute, or vpm), low amplitude vibration is more effective on higher fluid content contaminated cuttings, while just the opposite (3,000 to 4,000 vpm) is true of very low fluid content contaminated (or no fluid) cuttings. These vibration frequency ranges may also be employed for the vibration members mentioned herein (external vibration). When using internal vibration, either alone or in conjunction with external vibration members, proper breathing masks or other apparatus may be required for worker safety and health (to avoid breathing or coming in to contact with contaminated cuttings). Internal and external vibration members are available commercially, for example from Chicago Vibrator Products, a division of CVP Group, Inc.

Thus the apparatus, systems, and methods described herein provide a quick and safe way of weighing and distributing contaminated drill cuttings in an enclosed cuttings skip without having to open the enclosed cuttings skips, and with significantly reduced risk of injury and breathing discomfort to rig workers.

Embodiments disclosed herein include:

A: A contaminated drill cuttings weighing and distributing apparatus comprising:
  (a) a frame dimensioned to accept a contaminated cuttings skip;
  (b) one or more vibration members removably attached to the frame, the vibration members able to exert vibrations sufficient to substantially level contaminated drill cuttings in the contaminated cuttings skip;
  (c) one or more load cells placed in or on the frame configured to send signals representative of local load on the frame;
  (d) one or more logic controllers that receives the signals from the load cells and sends signals to the vibration members to vibrate the frame.

B. A system for easily and safely weighing and distributing contaminated drill cuttings in an enclosed cuttings skip, the system comprising:
  (a) an enclosed cuttings skip;
  (b) the weighing and drill cuttings distributing apparatus of Embodiment 1 upon which the enclosed cuttings skip is removably placed;
  (c) a contaminated cuttings hose or chute removably attached to a cuttings fill opening of the enclosed cuttings skip; and
  (d) one or more sources of power selected from the group consisting of hydraulic, pneumatic, and electric power removably attached to the vibration members and load cells.

C: A method of easily and safely weighing and distributing contaminated cuttings in an enclosed cuttings skip, the method comprising:
  (a) placing a contaminated cuttings skip onto an apparatus comprising:
    (i) a frame dimensioned to accept a contaminated cuttings skip;
    (ii) one or more vibration members removably attached to the frame, the vibration members able to exert vibrations sufficient to substantially level contaminated drill cuttings in the contaminated cuttings skip;
    (iii) one or more load cells place in or on the frame configured to send signals representative of local load on the frame;
    (iv) one or more logic controllers that receives the signals from the load cells and sends signals to the vibration members to vibrate the frame;
  (b) attaching a contaminated cuttings feed hose or chute to a feed opening on the enclosed cuttings skip;
  (c) flowing contaminated cuttings from a drilling or well completion operation into a cuttings skip through the contaminated cuttings feed hose or chute and into the feed opening of the cuttings skip;
  (d) determining weight at a plurality of local positions of the frame, enclosed cuttings skip, and contaminated cuttings inside the enclosed cuttings skip by operating the load cells; and
  (e) distributing the contaminated cuttings in the enclosed cuttings skip from an undisturbed state to a disturbed, substantially level state by activating and operating the vibration members.

Each of the embodiments A, B, and C may have one or more of the following additional elements in any combination:

Element 2. The contaminated drill cuttings weighing and distributing apparatus wherein the one or more vibration members are individually configured to operate in modes selected from the group consisting of continuous mode, periodic mode, and manual mode.

Element 3. The contaminated drill cuttings weighing and distributing apparatus of Embodiment A wherein the one or more vibration members are selected from the group consisting of hydraulic, pneumatic, and electronic.

Element 4. The contaminated drill cuttings weighing and distributing apparatus wherein the one or more vibration members are configured to gyrate (rotate, spin, revolve) the frame.

Element 5. The contaminated drill cuttings weighing and distributing apparatus wherein the one or more loads cells are selected from the group consisting of hydraulic, pneumatic, and strain gauge load cells.

Element 6. The contaminated drill cuttings weighing and distributing apparatus wherein the one or more vibration members and controllers are integral.

Element 7. The contaminated drill cuttings weighing and distributing apparatus wherein the number of load cells ranges from 1 to about 10.

Element 8. The contaminated drill cuttings weighing and distributing apparatus wherein the number of load cells ranges from about 2 to about 6.

Element 9. The contaminated drill cuttings weighing and distributing apparatus lifting points on the frame configured to allow the apparatus alone or the apparatus and a contaminated drill cuttings skip to be lifted and weighed.

Element 10. The contaminated drill cuttings weighing and distributing apparatus wherein the one or more loads cells includes a human/machine interface.

Element 11. The contaminated drill cuttings weighing and distributing apparatus wherein the frame includes one or more lugs adapted to constrain lateral movement of a contaminated cuttings skip on the frame.

Element 12. The contaminated drill cuttings weighing and distributing apparatus wherein the one or more lugs are adjustable.

Element 13. The contaminated drill cuttings weighing and distributing apparatus of wherein the frame comprises a body having four co-planar frame arms extending from a center of the frame, each frame arm having attached to a lower surface thereto a frame leg, the four co-planar frame arms defining an upper surface configured to receive a bottom of a contaminated cuttings skip.

Element 14. The contaminated drill cuttings weighing and distributing apparatus wherein at least one of the frame legs is adjustable to raise and lower respective frame arms.

Element 15. The contaminated drill cuttings weighing and distributing apparatus wherein each frame leg includes an elastomeric pad attached to a bottom of each frame leg.

Element 16. The contaminated drill cuttings weighing and distributing apparatus of further including three or more lifting points on the frame for attaching a lifting mechanism thereto for lifting the apparatus.

Element 17. The system for easily and safely weighing and distributing contaminated drill cuttings in an enclosed cuttings skip further comprising three or more slings or chains, one of each sling or chain attached to a respective one of the three or more lifting points.

Element 18: The method of including gyrating the frame by operating the vibration members.

From the foregoing detailed description of specific embodiments, it should be apparent that patentable apparatus, combinations, and methods have been described. Although specific embodiments of the disclosure have been described herein in some detail, this has been done solely for the purposes of describing various features and aspects of the apparatus, systems, and methods, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification would be to take an existing cuttings skip structure and modify it to include one or more strain gauges thereon, for example one on each corner of the cuttings skip, or on side panels or the floor of the skip. Another modification would be for skip suppliers to supply skips with built-in frames and vibration members, and strain gauges or other load cells. In other embodiments, the apparatus may be skid or truck-mounted.

What is claimed is:

1. A contaminated drill cuttings weighing and distributing apparatus comprising:
   (a) a frame dimensioned to accept a contaminated cuttings skip, wherein the frame comprises a body having four co-planar frame arms extending from a center of the frame, each frame arm having attached to a lower surface thereto a frame leg, the four co-planar frame arms defining an upper surface configured to receive a bottom of the contaminated cuttings skip;
   (b) one or more vibration members removably attached to the frame, the vibration members able to exert vibrations sufficient to substantially level contaminated drill cuttings in the contaminated cuttings skip;
   (c) one or more load cells placed in or on the frame configured to send signals representative of local load on the frame;
   (d) one or more logic controllers that receives the signals from the load cells and sends signals to the vibration members to vibrate the frame.

2. The contaminated drill cuttings weighing and distributing apparatus of claim 1 wherein the one or more vibration members are individually configured to operate in modes selected from the group consisting of continuous mode, periodic mode, and manual mode.

3. The contaminated drill cuttings weighing and distributing apparatus of claim 1 wherein the one or more vibration members are selected from the group consisting of hydraulic, pneumatic, and electronic.

4. The contaminated drill cuttings weighing and distributing apparatus of claim 1 wherein the one or more vibration members are configured to gyrate the frame.

5. The contaminated drill cuttings weighing and distributing apparatus of claim 1 wherein the one or more loads cells are selected from the group consisting of hydraulic, pneumatic, and strain gauge load cells.

6. The contaminated drill cuttings weighing and distributing apparatus of claim 1 wherein the one or more vibration members and controllers are integral.

7. The contaminated drill cuttings weighing and distributing apparatus of claim 1 wherein the number of load cells ranges from 1 to 10.

8. The contaminated drill cuttings weighing and distributing apparatus of claim 1 wherein the number of load cells ranges from 2 to 6.

9. The contaminated drill cuttings weighing and distributing apparatus of claim 1 including one or more lifting points on the frame configured to allow the apparatus alone or the apparatus to be lifted.

10. The contaminated drill cuttings weighing and distributing apparatus of claim 1 wherein the one or more loads cells includes a human/machine interface.

11. The contaminated drill cuttings weighing and distributing apparatus of claim 1 wherein the frame includes one or more lugs adapted to constrain lateral movement of a contaminated cuttings skip on the frame.

12. The contaminated drill cuttings weighing and distributing apparatus of claim 11 wherein the one or more lugs are adjustable.

13. The contaminated drill cuttings weighing and distributing apparatus of claim 1 wherein at least one of the frame legs is adjustable to raise and lower respective frame arms.

14. The contaminated drill cuttings weighing and distributing apparatus of claim 1 wherein each frame leg includes an elastomeric pad attached to a bottom of each frame leg.

15. The contaminated drill cuttings weighing and distributing apparatus of claim 1 further including three or more lifting points on the frame for attaching a lifting mechanism thereto for lifting the apparatus.

16. A system for easily and safely weighing and distributing contaminated drill cuttings in an enclosed cuttings skip, the system comprising:
(a) an enclosed cuttings skip;
(b) the weighing and drill cuttings distributing apparatus of claim 1 upon which the enclosed cuttings skip is removably placed;
(c) a contaminated cuttings hose or chute removably attached to a cuttings fill opening of the enclosed cuttings skip; and
(d) one or more sources of power selected from the group consisting of hydraulic, pneumatic, and electric power removably attached to the vibration members and load cells.

17. The system for easily and safely weighing and distributing contaminated drill cuttings in an enclosed cuttings skip of claim 16 further comprising three or more slings or chains, one of each sling or chain attached to a respective one of three or more lifting points.

18. A method of easily and safely weighing and distributing contaminated cuttings in an enclosed cuttings skip, the method comprising:
(a) placing a contaminated cuttings skip onto an apparatus comprising:
(i) a frame dimensioned to accept a contaminated cuttings skip, wherein the frame comprises a body having four co-planar frame arms extending from a center of the frame, each frame arm having attached to a lower surface thereto a frame leg, the four co-planar frame arms defining an upper surface configured to receive a bottom of the contaminated cuttings skip;
(ii) one or more vibration members removably attached to the frame, the vibration members able to exert vibrations sufficient to substantially level contaminated drill cuttings in the contaminated cuttings skip;
(iii) one or more load cells place in or on the frame configured to send signals representative of local load on the frame;
(iv) one or more logic controllers that receives the signals from the load cells and sends signals to the vibration members to vibrate the frame;
(b) attaching a contaminated cuttings feed hose or chute to a feed opening on the enclosed cuttings skip;
(c) flowing contaminated cuttings from a drilling or well completion operation into a cuttings skip through the contaminated cuttings feed hose or chute and into the feed opening of the cuttings skip;
(d) determining weight at a plurality of local positions of the frame, enclosed cuttings skip, and contaminated cuttings inside the enclosed cuttings skip by operating the load cells; and
(e) distributing the contaminated cuttings in the enclosed cuttings skip from an undisturbed state to a disturbed, substantially level state by activating and operating the vibration members.

19. The method of claim 18 including gyrating the frame by operating the vibration members.

* * * * *